(12) United States Patent
Kim

(10) Patent No.: US 9,356,326 B2
(45) Date of Patent: May 31, 2016

(54) TOP COVER AND BATTERY PACK HAVING THE SAME

(75) Inventor: Myung-Chul Kim, Yongin-si (KR)

(73) Assignees: SAMSUNG SDI CO., LTD., Yongin-si, Gyeonggi-do (KR); ROBERT BOSCH GmbH, Stuttgart (DE)

(*) Notice: Subject to any disclaimer, the term of this patent is extended or adjusted under 35 U.S.C. 154(b) by 957 days.

(21) Appl. No.: 13/559,035

(22) Filed: Jul. 26, 2012

(65) Prior Publication Data

US 2013/0224542 A1 Aug. 29, 2013

(30) Foreign Application Priority Data

Feb. 23, 2012 (KR) .......... 10-2012-0018453

(51) Int. Cl.
| | |
|---|---|
| *H01M 10/48* | (2006.01) |
| *H01M 10/6561* | (2014.01) |
| *H01M 2/10* | (2006.01) |
| *H01M 10/052* | (2010.01) |

(52) U.S. Cl.
CPC ........ *H01M 10/486* (2013.01); *H01M 10/6561* (2015.04); *H01M 2/1077* (2013.01); *H01M 10/052* (2013.01); *H01M 2220/20* (2013.01); *Y02T 10/7011* (2013.01)

(58) Field of Classification Search
None
See application file for complete search history.

(56) References Cited

U.S. PATENT DOCUMENTS

2011/0104533 A1* 5/2011 Seto ................ 429/90
2011/0165451 A1* 7/2011 Kim et al. ............ 429/153

FOREIGN PATENT DOCUMENTS

| KR | 10-0249892 B1 | 12/1999 |
| KR | 10-2001-0003229 A | 1/2001 |
| KR | 10-2011-0081023 | 7/2011 |

OTHER PUBLICATIONS

Korean Office Action dated Feb. 1, 2016.

* cited by examiner

*Primary Examiner* — Alix Eggerding
(74) *Attorney, Agent, or Firm* — Lee & Morse, P.C.

(57) ABSTRACT

A top cover includes a cover plate covering a plurality of battery cells and having an opening in at least one portion thereof, and at least one temperature measuring member mounted in the opening so as to measure a temperature of one the battery cells, the temperature measuring member having a temperature measuring portion coming in contact with the battery cell.

20 Claims, 5 Drawing Sheets

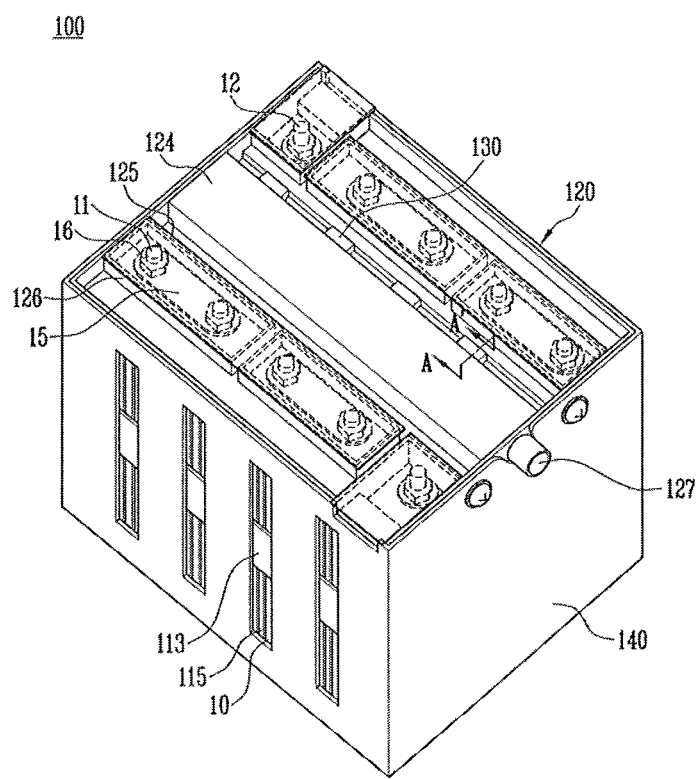

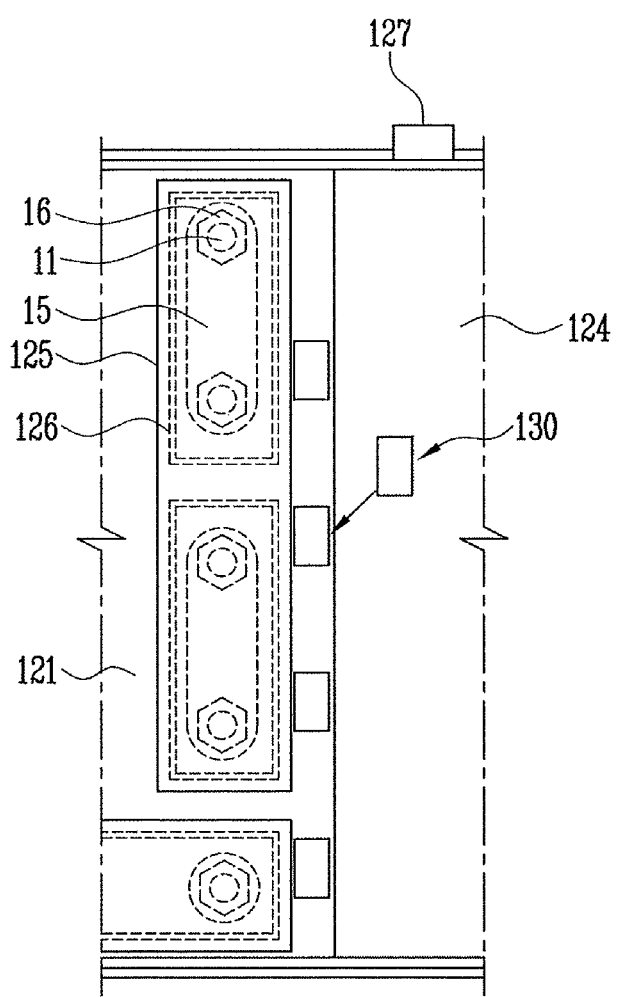

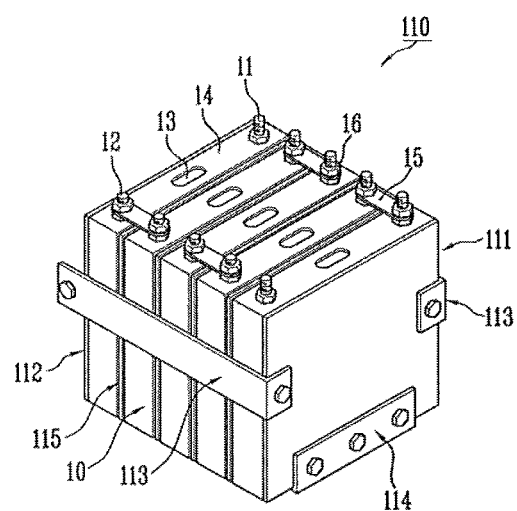

TOP COVER AND BATTERY PACK HAVING THE SAME

BACKGROUND

1. Field

Embodiments relate to a top cover having a temperature measuring member mounted thereto and a battery pack having the same.

2. Description of the Related Art

A high-power battery pack using a non-aqueous electrolyte with high energy density has recently been developed. The high-power battery pack is configured as a large-capacity battery pack manufactured by connecting a plurality of battery cells in series so as to be used in driving motors of devices requiring high power, e.g., electric vehicles and the like.

SUMMARY

According to an embodiment, there is provided a top cover including a cover plate covering a plurality of battery cells and having an opening in at least one portion thereof, a temperature measuring member mounted in the opening so as to measure a temperature of a battery cell of the plurality of battery cells, the temperature measuring member having a temperature measuring portion coming in contact with the battery cell. The cover plate may include a groove portion. The opening may be provided in a bottom surface of the cover plate and may connect with the groove portion.

The temperature measuring member may include a first latching projection at an upper or middle side of the temperature measuring portion and a second latching projection at a lower side of the second latching projection, the first latching projection and the second latching projection preventing separation of the temperature sensing member from the opening. The temperature measuring portion may include a cell contact portion that protrudes from the opening. A height of the cell contact portion protruding from the opening is greater than a distance from a lowest end of a bottom surface of the cover plate to the battery cell.

The temperature measuring member may include a recess between the cell contact portion and the second latching projection of the temperature measuring portion, the recess being configured to assist mounting of the temperature measuring member in the opening. A bottom portion of the cover plate adjacent to the opening may have a tapered shape narrowed in a direction of the battery cell. The temperature measuring portion may be made of a material including elastic plastic or rubber.

According to an embodiment, there is provided a battery pack including a plurality of battery cells arranged in one direction, each battery cell having a vent portion and electrode terminals, a top cover including a cover plate covering the plurality of battery cells, the cover plate having an opening so as to measure a temperature of a battery cell of the plurality of battery cells, the temperature measuring member coming in contact with the battery cell.

The opening may be in an area of the cover plate corresponding to an area of the battery cell between the vent portion and one of the electrode terminals.

The battery pack may further include a housing in which the plurality of battery cells are accommodated, the housing including a flow path of a refrigerant. The refrigerant may be a gas.

The housing may include a pair of end plates spaced apart from each other in one direction, the plurality of battery cells being accommodated therebetween, and one or more connecting members connecting the pair of end plates. The connecting member may include side brackets connecting side surfaces of the pair of end plates and a bottom bracket connecting bottom surfaces of the pair of end plates.

The cover plate may include a groove portion, and the opening may be at a bottom surface of the cover plate, the opening connecting with the groove portion.

The temperature measuring member may include a first latching projection at an upper or middle side of the temperature measuring portion and a second latching projection at a lower side of the temperature measuring portion, the first latching projection and the second latching projection preventing separation of the temperature sensing member from the opening.

The temperature measuring portion may include a cell contact portion that protrudes from the opening and contacts the battery cell, and a height of a cell contact portion protruding from the opening may be greater than a distance from a lowest end of a bottom surface of the cover plate to the battery cell.

The temperature measuring member may include a recess between the cell contact portion and the second latching projection of the temperature measuring portion, the recess being configured to assist mounting of the temperature measuring member in the opening.

A bottom portion of the cover plate adjacent to the opening may have a tapered shape narrowed in a direction toward the battery cell. The temperature measuring portion may be made of a material including elastic plastic or rubber. A heat conducting member may be between the bottom surface of the cell contact portion and the battery cell.

BRIEF DESCRIPTION OF THE DRAWINGS

Features will become apparent to those of ordinary skill in the art by describing in detail exemplary embodiments with reference to the attached drawings in which:

FIG. 1 illustrates a perspective view of a battery pack according to an embodiment.

FIG. 2 illustrates a partially enlarged view of a top cover of FIG. 1.

FIG. 5 illustrates a perspective view of a battery module included in the battery pack according to the embodiment.

DETAILED DESCRIPTION

Figure 3A:
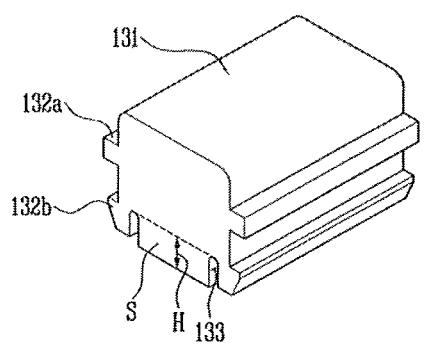
FIG. 3A illustrates an enlarged perspective view of a temperature measuring member of FIG. 1.

Korean Patent Application No. 10-2012-0018453, filed on Feb. 23, 2012, in the Korean Intellectual Property Office, and entitled: "Top Cover and Battery Pack Having the Same" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope thereof to those skilled in the art.

In the drawing figures, the dimensions of layers and regions may be exaggerated for clarity of illustration. Like reference numerals refer to like elements throughout.

Figure 3B:
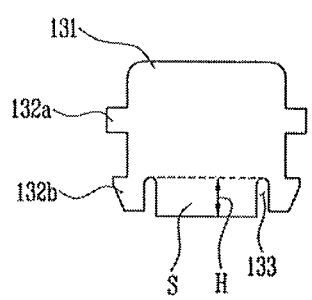
FIG. 3B illustrates a front view of the temperature measuring member of FIG. 1.
Figure 4A:
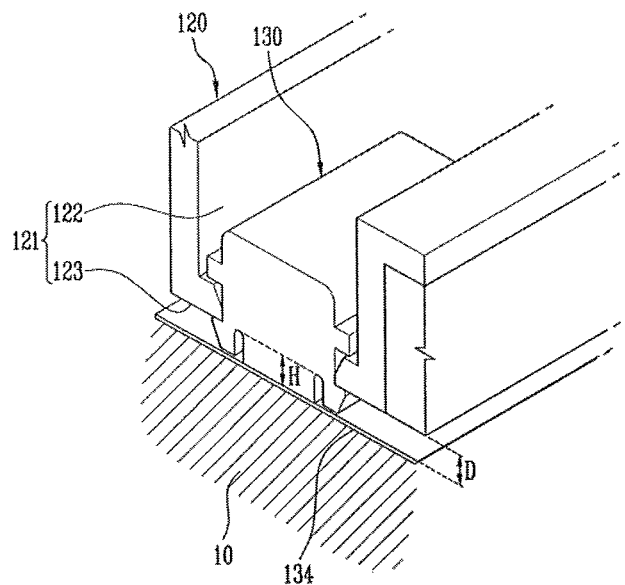
FIG. 4A illustrates a sectional view taken along line A-A' of FIG. 1 according to an embodiment.
Figure 4B:
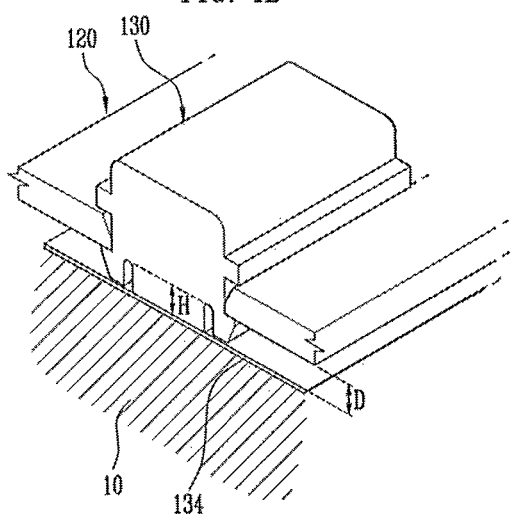
FIG. 4B illustrates a sectional view taken along line A-A' of FIG. 1 according to another embodiment.

FIG. 1 is a perspective view of a battery pack according to an embodiment. FIG. 2 is a partially enlarged view of a top cover of FIG. 1. FIG. 3A is an enlarged perspective view of a temperature measuring member of FIG. 1. FIG. 3B is a front view of the temperature measuring member of FIG. 1. FIG. 4A is a sectional view taken along line A-A' of FIG. 1 according to a first embodiment. FIG. 4B is a sectional view taken along line A-A' of FIG. 1 according to another embodiment. FIG. 5 is a perspective view of a battery module included in the battery pack according to the embodiment.

Referring to FIGS. 1 to 3B, the battery pack 100 according to an embodiment includes a plurality of battery cells 10 arranged in one direction and a top cover 120 having a cover plate 121 and a temperature measuring member 130. Each of the plurality of battery cells 10 may have a vent portion 13 and electrode terminals 11 and 12 including a positive electrode and a negative electrode. The cover plate 121 covers the plurality of battery cells 10 and has an opening formed in at least one portion thereof. The temperature measuring member 130 is mounted in the opening so as to measure a temperature of the battery cell 10 and comes in contact with the battery cell 10.

Referring to FIG. 2, the opening having the temperature measuring member 130 mounted therein is formed an area of the cover plate 121, corresponding to an area between the vent portion 13 and the electrode terminal 11 or 12. (In FIG. 2, the vent portion 13 is covered by a vent cover 124, described below.) A cooling method applied to the battery pack 100 according to this embodiment may be an air-cooling method using air as a refrigerant. Accordingly, the temperature of the battery pack 100 may be highest at the top cover 120 that is a top surface of the battery pack 100. The largest amount of heat may be generated in the area between the vent portion 13 and the electrode terminal 11 or 12. Accordingly, the temperature measuring member 130 may be mounted in the area of the cover plate 121 in the top cover 120 corresponding to the area between the vent portion 13 and the electrode terminal 11 or 12, so as to measure the maximum temperature of the battery cell. For example, the temperature measuring member 130 may be mounted in an area of the cover plate 121 corresponding to the area between the vent portion 13 and the negative electrode terminal in which a larger amount of heat is generally generated, rather than in an area of the cover plate corresponding to an area between vent portion 13 and the positive electrode terminal of the electrode terminals 11 and 12.

Referring to FIGS. 3A and 3B, the temperature measuring member 130 may include a temperature measuring portion 131, a first latching projection 132a and a second latching projection 132b. The first latching projection 132a may be provided at an upper or middle side of the temperature measuring portion 131 and the second latching projection 132b may be provided at a lower side of the temperature measuring portion so as to prevent the temperature measuring portion 131 from being separated from the opening. A recess 133 may be provided in the temperature measuring portion 131 between the second latching projection 132b and a cell contact portion S of the temperature measuring portion 131 that substantially comes in contact with the battery cell 10. The recess 133 is provided as described above, so that the second latching projection 132b can be more easily mounted by passing through the opening. For example, the recess 133 may allow the second latching projection 132b inwardly such that the temperature measuring member 130 may be snap-fit into the opening.

Referring to FIGS. 4A and 4B, the height H of the cell contact portion S of the temperature measuring portion 131, which substantially comes in contact with the battery cell 10, is formed greater than the distance from the lowermost end of a bottom surface 123 of the cover plate 121, in which the opening is formed, to the battery cell 10. The temperature measuring portion 131 according to this embodiment may be made of a material including plastic or rubber. For example, the temperature measuring portion may include an elastic material. Thus, although the height H of the cell contact portion S is greater than that of a space D between the battery cell 10 and the bottom surface 123 of the cover plate 121, in which the opening is formed, the cell contact portion S can be mounted in the space D. The cell contact portion S and the battery cell 10 may be adhered closely to each other so that a space is not produced between the cell contact portion S and the battery cell 10. Thus, the temperature of the battery cell 10 can be exactly measured. As such, the temperature of the battery cell 10, measured by the temperature measuring member 130, may become data to be used for adjusting the temperature of the battery pack 100 through a process of transferring the temperature data of the battery cell 10 to a cell supervision circuit through a wire (not shown) connected to the temperature measuring portion 131.

A thermal conducting member 134 through which the heat content of the battery cell 10 is well conducted to the temperature measuring portion 131 may be further interposed between the battery cell 10 and the cell contact portion S of the temperature measuring portion 131.

The bottom surface 123 of the cover plate 121 around the opening may have a tapered shape narrowed in the direction of the battery cell 10. Accordingly, the temperature measuring portion 131 having the recess 133 and the second latching projection 132b can be easily mounted by passing through the opening.

The temperature measuring portion 131 according to the embodiment shown in FIG. 4A may be mounted in the opening formed in the bottom surface 123 of the cover plate 121 having a groove portion 122. According to the embodiment shown in FIG. 4A, when the top surface of the top cover 120 is spaced apart relatively further from the battery cell 10, a step difference is formed, so that the battery cell 10 and the temperature measuring portion 131 can be easily adhered closely to each other.

When the top surface of the top cover 120 is not spaced apart relatively further from the battery cell 10, the temperature measuring portion 131 may be mounted in the opening having no step difference as shown in the configuration according to the embodiment shown in FIG. 4B.

A bottom case 140 and a battery module 110 accommodated in the top cover 120 will be described with reference to FIGS. 1 to 5. The battery module 110 may be arranged in one direction, and may include the plurality of battery cells 10 each having the vent portion 13 and the positive and negative electrodes. The battery cells 10 may be arranged so that wide surfaces of adjacent battery cells 10 face each other.

The battery cells 10 constituting the battery module 110 may be manufactured by accommodating an electrode assembly and an electrolyte in a battery case and then sealing the battery case having the electrode assembly accommodated therein using a cap plate 14. The electrode assembly may include a positive electrode plate, a negative electrode plate and a separator interposed between the electrode plates. The electrode terminals, which are the positive and negative electrode terminals 11 and 12 respectively connected to the positive and negative electrode plates, may be provided to protrude to the outside of the battery cell 10. The positive and negative electrode plates may generate electrochemical energy by reacting with the electrolyte, and the generated energy may be transferred to the outside of the battery cell 10 through the positive and negative electrode terminals 11 and 12. The vent portion 13 may be provided between the positive and negative electrode terminals 11 and 12 so as to act as a path along which gas is exhausted. A vent cover 124 may be provided at a portion of the top cover 120, corresponding to the vent portion 13. The vent cover 124 may have the shape of a hexahedron having an inside opened in one direction, and may be mounted on the battery cells 10 so that the opened surface faces the vent portions 13. A gas exhaustion port 127 may be provided at one end of the vent cover 124, and a gas flow path may be formed to be connected to the gas exhaustion port 127 by coming into close contact with the battery cells 10.

In this embodiment, it is described as an example that the battery cell 10 may be a prismatic lithium-ion secondary battery. However, in other implementations, the battery cell 10 may be one of various types and shapes, including a lithium polymer battery, a cylindrical battery, and the like.

The battery module 110 may include the plurality of battery cells 10, a pair of first and second end plates 111 and 112 provided to be spaced apart from each other, and connecting members 113 and 114 connecting the first and second end plates 111 and 112.

The first and second end plates 111 and 112 may be disposed to come into surface contact with outermost ones of the battery cells 10. Thus, the first and second end plates 111 and 112 can press the plurality of battery cells 10 in an inward direction of the plurality of battery cells 10. The connecting members 113 and 114 may be connected to the first and second end plates 111 and 112. One end of each of the connecting members 113 and 114 may be fastened to the first end plate 111, and the other end of each of the connecting members 113 and 114 may be fastened to the second end plate 112. The first and second end plates 111 and 112 and the connecting members 113 and 114 may be fastened by a member such as a bolt or nut.

The connecting members 113 and 114 may be connected to the first and second end plates 111 and 112, so as to provide a space in which the plurality of battery cells 10 can be arranged and to support both side surfaces and bottom surfaces of the battery cells 10. In FIG. 5, it is illustrated in this embodiment that two side connecting members 113 support the side surfaces of the battery cells 10, one side connecting member 113 being on each side of the battery cells 10 and that one bottom connecting member 114 supports the bottom surfaces of the battery cells 10. However, the position, shape, and number of each of the connecting members 113 and 114 provided to the battery module 110 may be freely modified according to the design of the battery module 110.

The battery cells 10 may be fixed in a spaced defined by the first and second end plates 111 and 112, the side connecting members 113 and the bottom connecting member 114. Thus, the battery cells 10 cannot be easily moved by an external impact. The positive and negative electrode terminals 11 and 12 of two adjacent battery cells 10 may be electrically connected through a bus-bar 15. Holes through which the positive and negative electrode terminals 11 and 12 can pass, may be provided in the bus-bar 15, and the bus-bar 15 through which the terminals are connected to each other may be fixed by a member such as a nut 16. A bus-bar cover may cover the bus-bar 125, and a partition wall 126 surround the bus-bar 15 may be provided.

A barrier 115 may be interposed between the battery cells 10. A spacer (not shown) may be provided to the barrier 115 so as to space apart the adjacent battery cells 10 from each other and to form a space between the battery cells 10. Thus, it may be possible to provide a moving path for air that is a refrigerant for cooling the battery cells 10.

By way of summation and review, a battery cell may include an electrolyte and an electrode assembly including a positive plate and a negative electrode plate. The battery cell may generate energy through an electrochemical reaction of these electrode plates and the electrolyte. In this case, gas and heat may be generated in the inside of the battery cell through a side reaction of the electrochemical reaction. As such, a plurality of battery cells may be deteriorated by the heat generated in the battery cells, and therefore, the lifetime of the battery cells may be reduced. Accordingly, it is desirable to measure the temperature of battery cells.

As described above, according to the present embodiments, it is possible to provide a top cover to which a temperature measuring member capable of exactly measuring heat generated a battery cell is mounted and a battery pack having the same.

Further, it is possible to provide a battery pack capable of simplifying an assembling process by integrating a temperature measuring member to a top cover.

Accordingly, the temperature measuring member may not be separated from the top cover but may be adhered closely to the battery cell by including a structure of a latching projection in the temperature measuring member. Accordingly, it may be possible to improve the measuring accuracy of the temperature measuring member.

Although it has been described in the embodiments that the battery cell is a prismatic lithium-ion secondary battery, in other implementations, batteries of various types and shapes, including a lithium polymer battery, a cylindrical battery, and the like, may be used.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A top cover, comprising:
    a cover plate covering a plurality of battery cells and having an opening in at least one portion thereof; and
    a temperature measuring member mounted in the opening so as to measure a temperature of a battery cell of the plurality of battery cells, the temperature measuring member having a temperature measuring portion coming in contact with the battery cell, and the temperature measuring member including a latching projection at a lower side of the temperature measuring portion, the latching projection having an upper surface that engages a lower surface of the bottom portion of the cover plate adjacent to the opening, the latching projection preventing separation of the temperature measuring member from the opening.

2. The top cover as claimed in claim 1, wherein:
    the cover plate includes a groove portion, and
    the opening is provided in a bottom surface of the cover plate, the opening connecting with the groove portion.

3. The top cover as claimed in claim 1, wherein the temperature measuring member further includes an additional latching projection at an upper or middle side of the temperature measuring portion, the latching projection and the additional latching projection both preventing separation of the temperature measuring member from the opening.

4. The top cover as claimed in claim 3, wherein:
the temperature measuring portion includes a cell contact portion that protrudes from the opening, and
a height of the cell contact portion protruding from the opening is greater than a distance from a lowest end of a bottom surface of the cover plate to the battery cell.

5. The top cover as claimed in claim 4, wherein the temperature measuring member includes a recess between the cell contact portion and the latching projection of the temperature measuring portion, the recess being configured to assist mounting of the temperature measuring member in the opening.

6. The top cover as claimed in claim 1, wherein a bottom portion of the cover plate adjacent to the opening has a tapered shape narrowed in a direction of the battery cell.

7. The top cover as claimed in claim 1, wherein the temperature measuring portion is made of a material including elastic plastic or rubber.

8. A battery pack, comprising:
a plurality of battery cells arranged in one direction, each battery cell having a vent portion and electrode terminals;
a top cover including a cover plate covering the plurality of battery cells, the top cover having an opening in at least one portion thereof; and
a temperature measuring member mounted in the opening so as to measure a temperature of a battery cell of the plurality of battery cells, the temperature measuring member coming in contact with the battery cell, wherein the temperature measuring member includes a latching projection at a lower side of the temperature measuring portion, the latching projection having an upper surface that engages a lower surface of the bottom portion of the cover plate adjacent to the opening, the latching projection preventing separation of the temperature measuring member from the opening.

9. The battery pack as claimed in claim 8, wherein the opening is in an area of the cover plate corresponding to an area of the battery cell between the vent portion and one of the electrode terminals.

10. The battery pack as claimed in claim 8, further comprising a housing in which the plurality of battery cells are accommodated, the housing including a flow path of a refrigerant.

11. The battery pack as claimed in claim 10, wherein the refrigerant is a gas.

12. The battery pack as claimed in claim 10, wherein the housing includes a pair of end plates spaced apart from each other in one direction, the plurality of battery cells being accommodated therebetween, and one or more connecting members connecting the pair of end plates.

13. The battery pack as claimed in claim 12, wherein the connecting member includes side brackets connecting side surfaces of the pair of end plates and a bottom bracket connecting bottom surfaces of the pair of end plates.

14. The battery pack as claimed in claim 8, wherein:
the cover plate includes a groove portion, and
the opening is at a bottom surface of the cover plate, the opening connecting with the groove portion.

15. The battery pack as claimed in claim 8, wherein the temperature measuring member includes an additional latching projection at an upper or middle side of the temperature measuring portion, the latching projection and the additional latching projection both preventing separation of the temperature measuring member from the opening.

16. The battery pack as claimed in claim 15, wherein:
the temperature measuring portion includes a cell contact portion that protrudes from the opening and contacts the battery cell, and
a height of a cell contact portion protruding from the opening is greater than a distance from a lowest end of a bottom surface of the cover plate to the battery cell.

17. The battery pack as claimed in claim 16, wherein the temperature measuring member includes a recess between the cell contact portion and the latching projection of the temperature measuring portion, the recess being configured to assist mounting of the temperature measuring member in the opening.

18. The battery pack as claimed in claim 8, wherein a bottom portion of the cover plate adjacent to the opening has a tapered shape narrowed in a direction toward the battery cell.

19. The battery pack as claimed in claim 8, wherein the temperature measuring portion is made of a material including elastic plastic or rubber.

20. The battery pack as claimed in claim 16, wherein a heat conducting member is between the bottom surface of the cell contact portion and the battery cell.

* * * * *